March 28, 1961     J. W. GIFFEN     2,976,611

METAL FRAME MANUFACTURE

Filed Dec. 2, 1955     4 Sheets-Sheet 1

INVENTOR.
JAMES W. GIFFEN
BY Clarence R. Patty, Jr.
ATTORNEY

March 28, 1961
J. W. GIFFEN
2,976,611
METAL FRAME MANUFACTURE
Filed Dec. 2, 1955
4 Sheets-Sheet 2
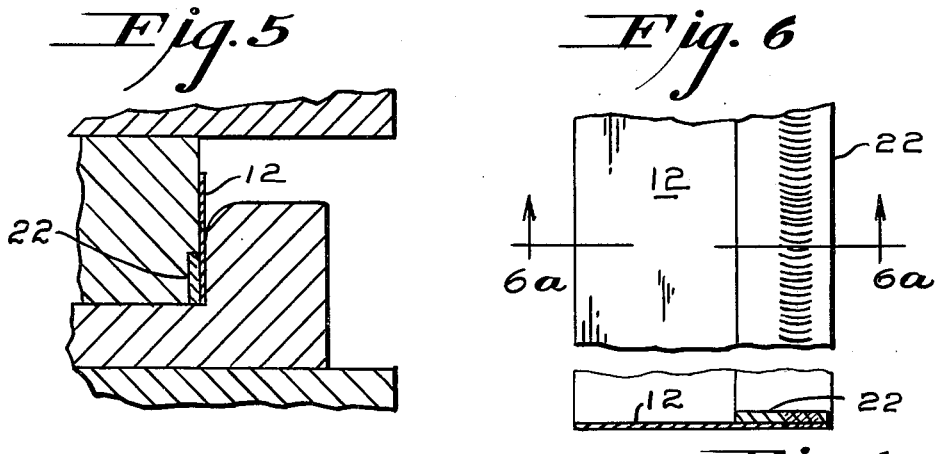
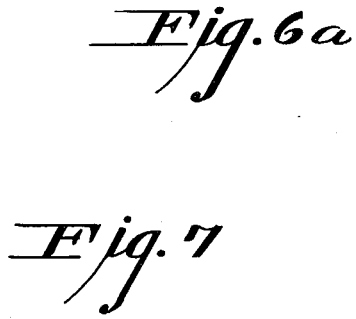
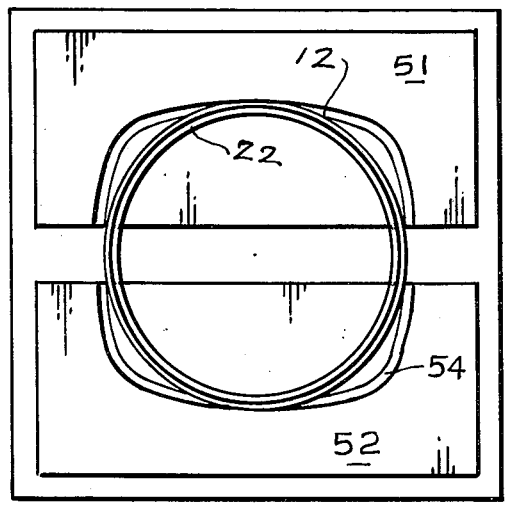
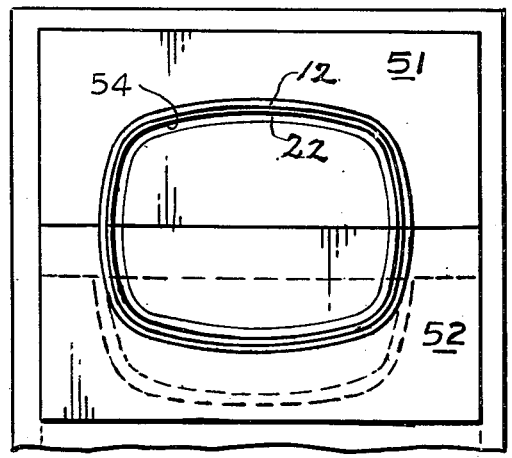
INVENTOR.
JAMES W. GIFFEN
BY Clarence R. Patty Jr.
ATTORNEY

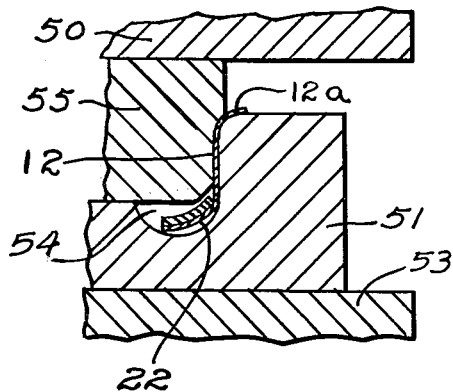
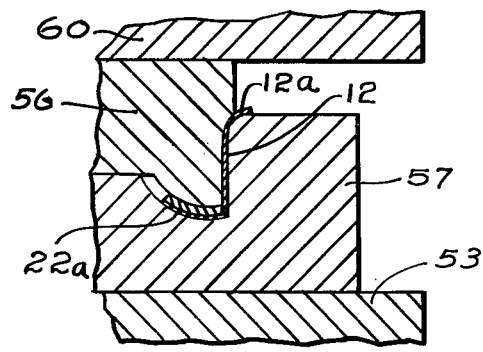
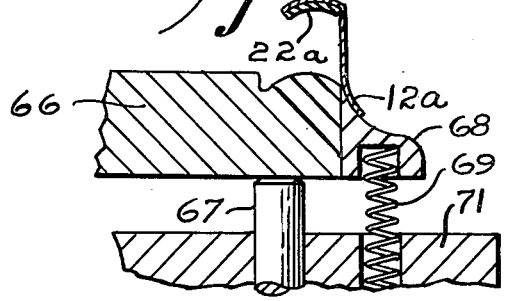
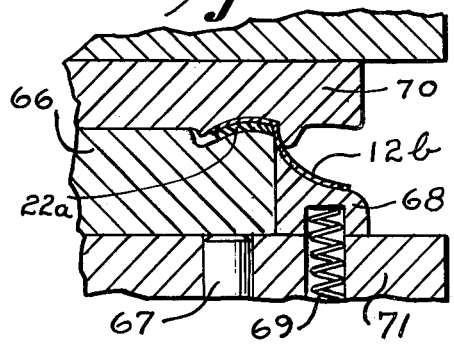
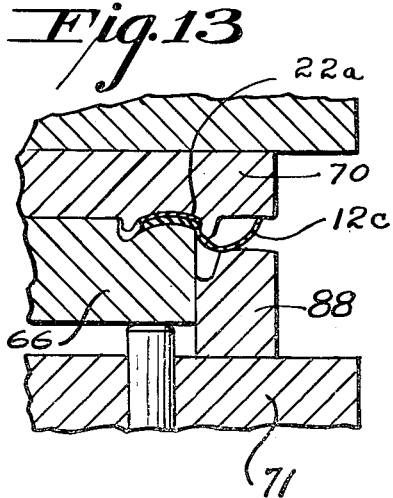
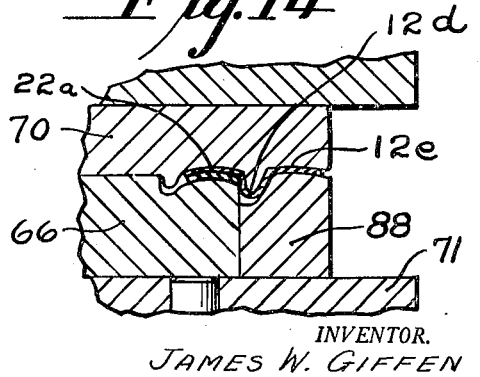

March 28, 1961 J. W. GIFFEN 2,976,611
METAL FRAME MANUFACTURE
Filed Dec. 2, 1955 4 Sheets-Sheet 4
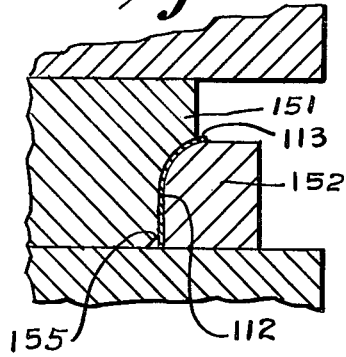
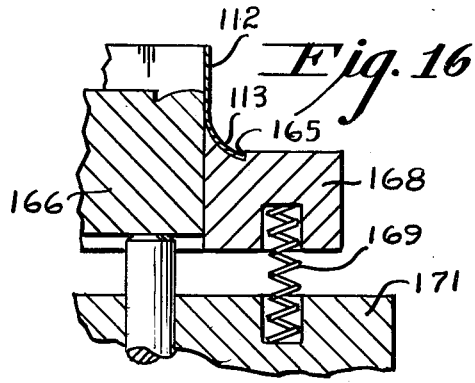
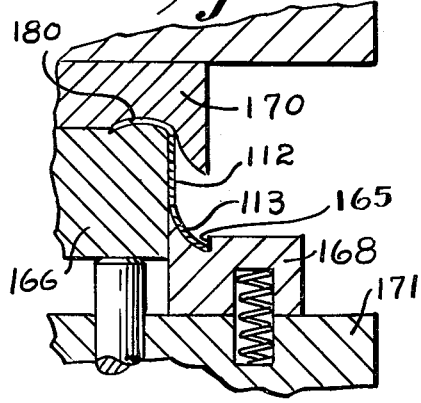
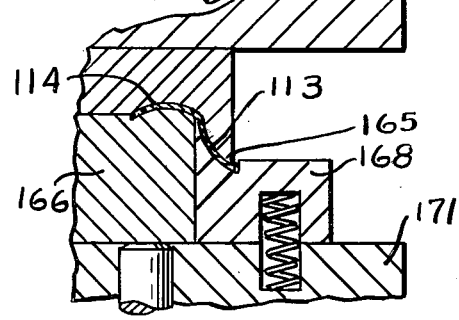
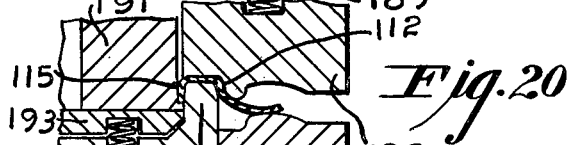
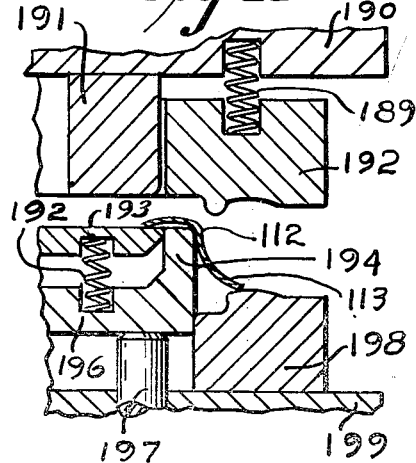
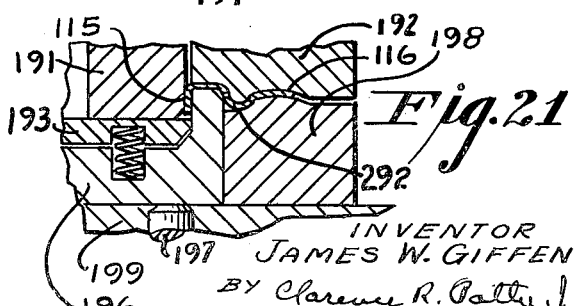
INVENTOR
JAMES W. GIFFEN
BY Clarence R. Patty Jr.
ATTORNEY United States Patent Office 2,976,611
Patented Mar. 28, 1961

2,976,611

METAL FRAME MANUFACTURE

James W. Giffen, Corning, N.Y., assignor to Corning Glass Works, Corning, N.Y., a corporation of New York Filed Dec. 2, 1955, Ser. No. 550,657

3 Claims. (Cl. 29—553)

The present invention relates to the production of metal frames of precise dimensional characteristics suitable for use as sealing elements between glass television tube envelope parts. The invention is particularly concerned with economical production of frames or sealing elements that, in cross section, are of two thicknesses, as shown for example in a Blanding-Shaver application Serial No. 383,-804, filed October 21, 1953, now Patent No. 2,936,924, and owned by the assignee of the instant application, and to generally similar frames or sealing elements that in cross section are of uniform thickness.

Prior to the present invention frames or sealing elements of the foregoing general character were manufactured from parts punched out of sheet material, and having the approximate outline of the final sealing element. In the manufacture of a single thickness sealing element the part was punched out of sheet material and then formed to impart to it the desired transverse configuration. In the manufacture of the two thickness element, the two parts were separately punched out of sheet material and separately formed to impart to them the desired transverse cross sectional configurations, placed one upon the other in a special holding fixture and welded into a complete frame or sealing element.

As will be clearly evident, the foregoing methods of obtaining such sealing elements is extremely wasteful of material, since the entire center sections of the sheets from which they are punched become scrap. Moreover, because of strains introduced during the welding operation, two thickness frames or sealing elements produced in the above fashion are warped and require further treatment, as by subjecting them to high pressure by a coining press to impart to them the essential degree of flatness required for their satisfactory use.

According to the present invention the frames or sealing elements are made of strips of material of the required width and thickness, formed into ordinary bands or hoops and their ends butt welded together.

In making the two thickness frames, one strip is usually of much thicker material than the other. Because of the thickness of the material required for the one strip it is passed through a bending roll which curls it to circular hoop form with the ends practically touching. Owing to the flexibility of the other strip, rolling of it to circular hoop form prior to welding is unnecessary. By a simple shearing operation the upset flashing left by the welder is removed from the respective hoops.

The diameters of the respective hoops are such that the one snugly fits within the other and, by use of a suitable assembly die, is placed in a desired position therein. The assembled hoops are next spot welded to one another at spaced intervals, in order to hold them in their desired relation while subsequently seam welding them to one another all the way around along a line intermediate the lateral margins of the narrower of the two hoops.

The frame comprising the united hoops is now subjected to a series of forming and/or cold forging operations to transform it into a rigid circular or generally rectangular form, of the desired transverse cross sectional configuration. These operations stretch and/or compress the material from which the hoops were made beyond its elastic limit throughout and in doing so completely relieves any residual welding strains. Therefore, the resulting frame or sealing element lays perfectly flat upon the completion of its final forming operation.

In making a frame or sealing element from a single thickness of material, the forming operations are generally similar to those employed in forming the two thickness frames.

For a better understanding of the invention reference is made to the accompanying drawing wherein:

Fig. 5 is a view, in section, of a fragment of a fixture in which two hoops may be assembled in their desired predetermined relation, and also shows a sectional view of such hoops.

Fig. 6 is a view, on an enlarged scale, of a fragment of two hoops and indicates by arcuate lines the welding marks created in joining them to one another.

Fig. 6a is a sectional view taken on line 6a—6a of Fig. 6.

Fig. 7 is a plan view of the laterally separated bottom sections of a die into which two joined hoops have been placed.

Fig. 8 is a plan view of the die sections shown in Fig. 7 closed and the hoops therein formed to the generally rectangular configuration of the frame desired.

Fig. 9 is a view, in section, of a fragment of the complete die assembly (of which Fig. 7 or 8 is a portion) and of a frame therein partly formed.

Fig. 10 is a view, similar to Fig. 9, of a forming die assembly and of a frame therein in its second stage of formation.

Fig. 11 is a view, in section, of a fragment of the lower elements of another forming die assembly and of a frame still in its second stage of formation but inverted with respect to its previous forming position.

Fig. 12 is a view similar to Fig. 11 also showing a fragment of the punch, with the punch down and the frame in its third stage of formation.

Fig. 13 is a view similar to Fig. 12 of the forming die of Fig. 12 with a different lower ring section and with the associated frame in the process of being given its final form.

Fig. 14 is a view similar to Fig. 13 showing the punch all the way down and the frame shaped to its final form.

Fig. 15 is a view, in section, of a fragment of a die similar to that of Fig. 9, and of a single hoop frame partly formed therein.

Fig. 16 is a view, in section, of a fragment of another forming die assembly generally similar to that of Fig. 11, and of a single hoop frame in the form in which it was flared by the punch and die of Fig. 15.

Fig. 17 is a view similar to Fig. 16, but showing a punch as having engaged and lowered the frame and through the medium thereof has lowered its frame supporting flare ring bottomed on the die shoe.

Fig. 18 is a view similar to Fig. 17, but with the punch having bottomed the cushion plate on the die shoe and having forced the upper region of the frame into a flange cavity remaining between the cushion plate and the punch.

Fig. 19 is a view, in section, of a fragment of a complete punch and die assembly in which the frame shown therein, as taken from the die of Fig. 18, may be pressed to its final form.

Fig. 20 is a view similar to Fig. 19, but wherein the inner punch section has been lowered sufficiently to form the inner lip of the frame only.

Fig. 21 is a view similar to Fig. 20, but with the frame pressed to its final form.

Figure 1:
Fig. 1 is a perspective view of a strip of material for use in forming a frame of a single piece of material or alternatively for use as one part of a two thickness frame.
Figure 2:
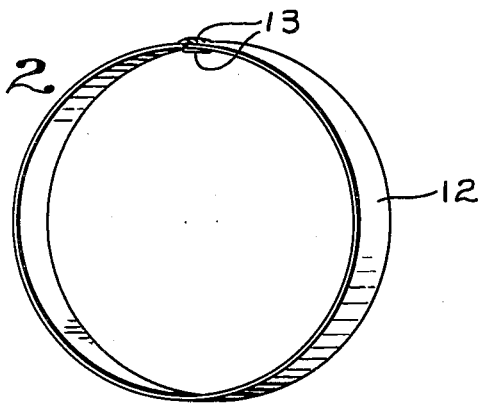
Fig. 2 is a perspective view of the strip of Fig. 1 with the ends welded together.
Figure 3:
Fig. 3 is a view similar to Fig. 1 of a second strip of material to be employed in forming a second hoop element of the frame.

Referring particularly now to Figs. 1 and 2 of the drawings, a flat strip 11 of metal, of a length equal to the perimeter of the finished frame on its approximate cross sectional centerline, is cut from a coil of strip material of a width equal to the amount of metal required in the cross section of the finished frame. Typically a strip .025 inch thick and approximately 2" wide is used, although the method is in no respect limited to such dimensions. Strip 11 is formed into a hoop 12 with its ends abutting and welded together as shown. In the welding process thickened portions 13 of excess metal are formed. This excess metal is removed to form a hoop of uniform thickness throughout suitable for use in either type of frame to be formed.

Referring now to Figs. 3 through 14 the manufacture of the two thickness frame will be described in detail.

A strip 21, which usually is about 0.80 inch thick and .750 inch wide, after having been passed through a bending roll, is formed into a hoop 22 (Fig. 5) in the same fashion as was strip 11, and is made in such external dimension as to be a tight fit into hoop 12. After such hoops have been so assembled in their desired relationship they are welded or otherwise joined together in sealing relation, and appear as illustrated in Figs. 6 and 6a.

The so-formed frame with its hoop portion 22 down is now fitted into a forming die assembly (Figs. 7 and 8) whose bottom sections 51 and 52 are closable by lateral movement of section 52 to force the frame to take the contour of the die cavity. The simplest form of frame is of circular outline, and requires the use of a laterally separable die for loading and unloading convenience only. However, a more commonly desired outline of frame is the generally rectangular one shown in Fig. 4 with the sides and ends bulged and the corners rounded about approximately 4 inch radii.

The size of the cavity formed by sections 51 and 52 when closed is such that the frame lies tightly against the cavity wall at all points about its periphery.

Figure 4:
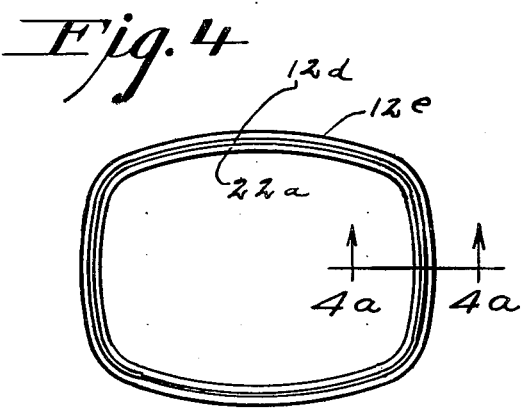
Fig. 4 is a plan view, on a greatly reduced scale, of a completed frame formed of hoops made of the strips of Figs. 1 and 2.
Figure 4A:
Fig. 4a is a sectional view, on an enlarged scale, taken on line 4a—4a of Fig. 4.

After die sections 51 and 52 have been laterally closed about the frame, the punch 55 (Fig. 9) is lowered into the die cavity and the hoop portions 12 and 22 flared outwardly and inwardly respectively as indicated. More specifically, punch 55 is of a size and shape to just enter the band or hoop 12, which is now shaped to the contour of the generally rectangular die sections 51 and 52, and has a 30° chamber around its nose to lead it into the top of hoop 12. As the punch is lowered it slides freely through hoop 12 until it contacts the upper edge of hoop 22 which it will not pass through. In reaching this position a shoulder on the punch 55 will have formed a flare 12a on the top edge of the hoop 12 as required for the next operation upon the frame. As the punch 55 continues downward, it forces the hoop 22 ahead of it, which in turn carries the hoop 12 along, since they are welded together, into a radius in the bottom of the die. This radius is tangent to the vertical wall of the die contour and serves as a wedge to force the lower edge of the frame to converge inward until it takes an approximately 45° angle in groove 54 at all points about the periphery by the time the punch has reached the bottom position. Since the metal is rather thick in the lower region of the frame this 45° angle includes all of it. However, the portion of the frame embodying hoop 22 is formed in a radius and it has a slight tendency to curl, but this curl is not objectionable since it is approaching the required radius in that portion of the finished part, as is clear from Fig. 4a.

The next forming step is carried out between punch and die members such as 56 and 57 of Fig. 10 thus forming the portion of the frame in which hoop 22 and part of hoop 12 have been embodied into an inwardly extending flange 22a.

The semi-formed frame is next placed in inverted position about a forming die cushion plate 66 (Figs. 11 to 14) which is supported in a common fashion on cushion pins such as 67 of the forming press (not shown) with the flared portion 12a of the frame resting on a flaring ring 68 surrounding cushion plate 66 and lightly supported in the elevated position on springs such as 69 to facilitate loading. Upon lowering of the punch 70 to the position shown in Fig. 12 the lightly supported ring 68 and the frame are lowered in unison until the punch 70 engages the cushion plate 66 with frame portion 22a therebetween in the cavity provided, by which time the ring 68 is seated upon the lower die shoe 71. As the punch 70 forces the portion the cushion plate 66 down into engagement with shoe 71 the portion 12a of the frame is further formed into flare 12b, Fig. 12.

The frame is next placed upon a finish forming die cushion plate 66 (Fig. 13) which in this instance is surrounded by a forming ring 88 rigidly seated on the lower die shoe 71. The initial stage of lowering the punch 70 to the position shown in Fig. 13 reshapes the flare 12b to the form indicated as 12c. As the punch 70 is driven to its home position with the cushion plate 66 bottomed upon the lower shoe 71, portion 12c takes the form of a rib 12d surrounded by a flat annular outwardly extending flange 12e.

In the formation of a single hoop frame or sealing element the hoop 112 (Fig. 15) which may be in all respects like hoop 12, and is brought to rectangular form in identically the same fashion as described with respect to the two thickness hoop in a die such as illustrated in Fig. 15 having a one piece punch 151 and open and shut bottom sections, such as section 152, similar to sections 51 and 52 of Fig. 5. The nose of the punch 151 is of a size and shape to just center the now rectangular shaped frame 112 without stretching the metal and has a chamber 155 all around its lead edge to assist it in doing so. As the punch 151 is bottomed it forms the upper portion of the hoop or frame 112 into a flare 113 so that the frame 112 will retain its so called rectangular shape upon removal from the die.

The so formed frame 112 is now transferred to the lower sections of a die shown in Fig. 16 having parts 166, 168 and 171 in general corresponding to parts 66, 68 and 71 of the die of Fig. 11. The die of Fig. 16 differs primarily from that of Fig. 11 in that the part 168 comprises a flare receiving ring provided with a stop 165.

In loading the lower die sections of Fig. 16, the partially formed frame 112 is inverted with respect to the way it came out of the first operation die (Fig. 15), so that its flared out portion 113 rests on the elevated flare receiving ring 168 in the manner shown.

Referring now to Fig. 17, the punch 170 is shown as having engaged the upper edge of the frame 112 and because of the engagement of its flare 113 with stop 165, has propelled the lightly supported ring 168 downward into engagement with the bottom die shoe 171. As will be observed, such lowering of the punch 170 has brought it into engagement with a surface of the cushion plate 166, leaving a slot 180 between them that is just sufficiently wide to permit the top of the partially formed frame 112 to enter it. Since the lower edge of flared portion 113 is seated against the flare ring stop 165, and since the flare ring 168 is now resting on the bottom die shoe 171 further downward movement of punch 170 will force the top of the frame to enter the slot 180. As will be understood slot 180 curls inward at all points about the periphery and this forces the frame 112 to do the same as the punch 170 is being lowered to the home position, illustrated in Fig. 18. Coordination of the slot width versus frame metal thickness and air cushion pressure permits this substantial extrusion of metal into the slot along its entire perimeter without wrinkling even in the corner sections where the radius is comparatively short. Inner horizontal flanges such as 114 so formed measuring well in excess of one inch from the outside of the curl radius to the inner edge have been successfully made in this fashion.

In forming a single thickness frame it is desirable to add to its stiffness by forming the inner margin of flange 114 into a lip. Accordingly, the final forming operation is carried out by the punch and die assembly depicted in Figs. 19-21. The punch in this instance comprises inner and outer sections. The inner section 191 is mounted solidly against the upper die shoe 190 and is of a size and contour to form the lip 115. The outer section 192 has an inside contour that exactly matches the outside contour of the inner section 191 and is of a size to slidably fit thereabout. Section 192 is suspended from the upper die shoe 190 by shoulder bolts (not shown) in such a fashion as to position the ring down from the upper die shoe such distance that the lower faces of the two punch sections 191 and 192 are in the same plane, as illustrated in Fig. 19. Additionally, the section 192 is resiliently urged into the position shown by springs such as 189.

The lower portion of the die comprises an outer ring 198 and a cushion plate 196. The outer ring 198 is mounted rigidly on the lower die shoe 199, whereas the cushion plate 196 is carried on cushion pins such as 197 at an elevated position whenever the plunger sections 191 and 192 are in their uppermost positions. The cushion plate 196 proper has a ledge 194 surrounding a center plate 193 confined within such ledge and supported by springs such as 192. The inside contour of the ledge 194 is of a size and shape to just provide clearance for the frame material between it and the inner section 191 of the punch, as is most clearly evident from an examination of Fig. 21.

In the final step of formation the frame 112 is arranged over the cushion plate 196 with the same side up as when it was lifted from the cushion plate 166 (Fig. 18).

In the final forming operation punch sections 191 and 192 travel downward together until they contact the frame 112 and flatten it against the top surface of the cushion plate ledge 194. As will be understood the pressure in the cushion storage tank, exerting pressure against pins such as 197, must be high enough to hold the cushion plate 196 stationary until the inner section 191 of the punch has forced the spring loaded center plate 193 to its bottomed position and at the same time formed the vertical lip 115 around the inside of the frame. In the meantime the ledge 194 will have stopped the downward movement of the outer punch section 192 and thereby compressed its springs such as 189 until it is seated solidly against the upper die shoe 190. The continued lowering of the punch sections 191 and 192 in unison will now force the lowering of the cushion plate 196 until it has bottomed on the lower die shoe 199. In so doing it carries with it the tightly squeezed and already formed inner lip 115 of the frame 112 and positions it in the proper plane relative to the rib 292 and the outer flange portion 116 which is also formed to the finish shape by the bottoming of the outer section 192 of the punch on the lower die shoe outer ring 198.

Although the invention has been herein shown and described as applied to the manufacture of specific forms of frames, it is equally applicable for use in the formation of other articles of a generally similar nature without deviating from the spirit and scope of the invention as claimed.

What is claimed is:

1. The method of forming a metal frame which includes forming an endless hoop of sheet metal with a passage therethrough parallel to the plane of the broad surfaces thereof, closing die sections about such hoop to impart to it the outline of the desired frame, outwardly flaring one lateral margin thereof to impart to it rigidity, thereafter directing the unflared edge of the hoop into the entrance of a confined space within the die extending inward from about its entire perimeter toward the center of the hoop passage, and exerting pressure on the edge of the flared portion of the hoop and on a broad surface thereof toward the unflared edge to extrude the unflared edge portion progressively into a flange within such space.

2. A method of making a metal frame suitable for use as a sealing strip in a television picture tube envelope assembly, which includes welding the ends of a flat strip of sheet metal together to form a hoop with a passage therethrough parallel to the planes of the broad surfaces thereof, welding the ends of a slightly shorter narrower strip of sheet metal together to form a hoop therefrom of a perimeter to closely fit within the confines of the other hoop, placing the hoop formed from the shorter narrower strip within the larger hoop, welding said hoops to one another along a line extending throughout their perimeters to form a hoop that transversely is in one part relatively thick compared to another part, imparting to such hoop a desired frame outline by closing die sections about said hoop to conform it to such outline, and deforming a portion of one edge of said hoop into the passage therethrough, similarly reforming a portion of its other edge radially outward so that such a hoop has the broad surfaces of its thin portion for the most part and the entire broad surfaces of the thick portion in planes normal to the passage therethrough.

3. The method of forming an inwardly extending flange from the portion of a hoop of material whose bore dimension is less than the bore dimension of the remainder thereof and whose external dimension is of a uniform dimension throughout its height, which includes rigidly closely confining the hoop about its exterior surface with one of its lateral edges closing the entrance to a flange forming cavity adjacent which the hoop is arranged and extending inwardly therefrom about its entire periphery, and directing a forming punch into the hoop passage of an external dimension greater than the cross section of the bore of the reduced bore portion thereof, engaging the upper edge of that portion of the hoop of reduced bore dimension and then applying the necessary pressure to said punch to force said confined hoop ahead of it while progressively deforming the reduced bore portion thereof into such cavity.

References Cited in the file of this patent

UNITED STATES PATENTS

| | | |
|---|---|---|
| 488,633 | Paddack | Dec. 27, 1892 |
| 879,925 | Taylor | Feb. 25, 1908 |
| 1,610,383 | Johnson | Dec. 14, 1926 |
| 1,689,784 | Klaus | Oct. 30, 1928 |
| 1,694,689 | Pritchard | Dec. 11, 1928 |
| 1,710,930 | Klaus | Apr. 30, 1929 |
| 1,717,419 | Steinmann | June 18, 1929 |
| 1,839,501 | Rollason | Jan. 5, 1932 |
| 2,080,866 | Lobdell | May 18, 1937 |
| 2,133,092 | Gettig | Oct. 11, 1938 |
| 2,185,347 | LeJeune | Jan. 2, 1940 |
| 2,349,738 | LeJeune | May 23, 1944 |
| 2,413,547 | Davidson | Dec. 31, 1946 |
| 2,529,088 | Leake | Nov. 7, 1950 |
| 2,678,620 | Cote | May 18, 1954 |
| 2,825,961 | Woodward | Mar. 11, 1958 |

FOREIGN PATENTS

| | | |
|---|---|---|
| 102,704 | Australia | Dec. 16, 1937 |
| 206,066 | Australia | Feb. 17, 1955 |